United States Patent [19]

Hutter

[11] Patent Number: 4,922,084
[45] Date of Patent: May 1, 1990

[54] UNI-DIRECTIONAL HEATING APPARATUS

[76] Inventor: Gerhard Hutter, 993 Lake Ave., Greenwich, Conn. 06830

[21] Appl. No.: 399,266

[22] Filed: Aug. 28, 1989

[51] Int. Cl.5 ............................................. H05B 3/18
[52] U.S. Cl. ................................... 219/549; 219/213; 219/537; 219/548; 219/345
[58] Field of Search .............. 219/345, 213, 339, 520, 219/521, 523, 528, 535, 536, 537, 544, 546, 548, 549, 550

[56] References Cited

U.S. PATENT DOCUMENTS 4,733,057 3/1988 Stanzel ................................ 219/345

FOREIGN PATENT DOCUMENTS 0087737 4/1987 Japan ................................... 219/213
1165701 10/1969 United Kingdom ................. 219/213

Primary Examiner—Bruce A. Reynolds
Assistant Examiner—Leon K. Fuller
Attorney, Agent, or Firm—Alfred E. Miller

[57] ABSTRACT

An indirect heating apparatus placement under floor or wall surfaces in which the heat is generated in one direction into the room to be heated and includes simplified insulation elements having clamping type connections which are removably attached to the heating coils, and can be adapted for unlimited varieties of room shapes and sizes. The heating coil is surrounded by high insulating material except for the surface facing the room to be heated. Consequently, indirect radiant heat can be projected in essentially one direction.

6 Claims, 2 Drawing Sheets

U.S. Patent May 1, 1990 Sheet 1 of 2 4,922,084
FIG.1
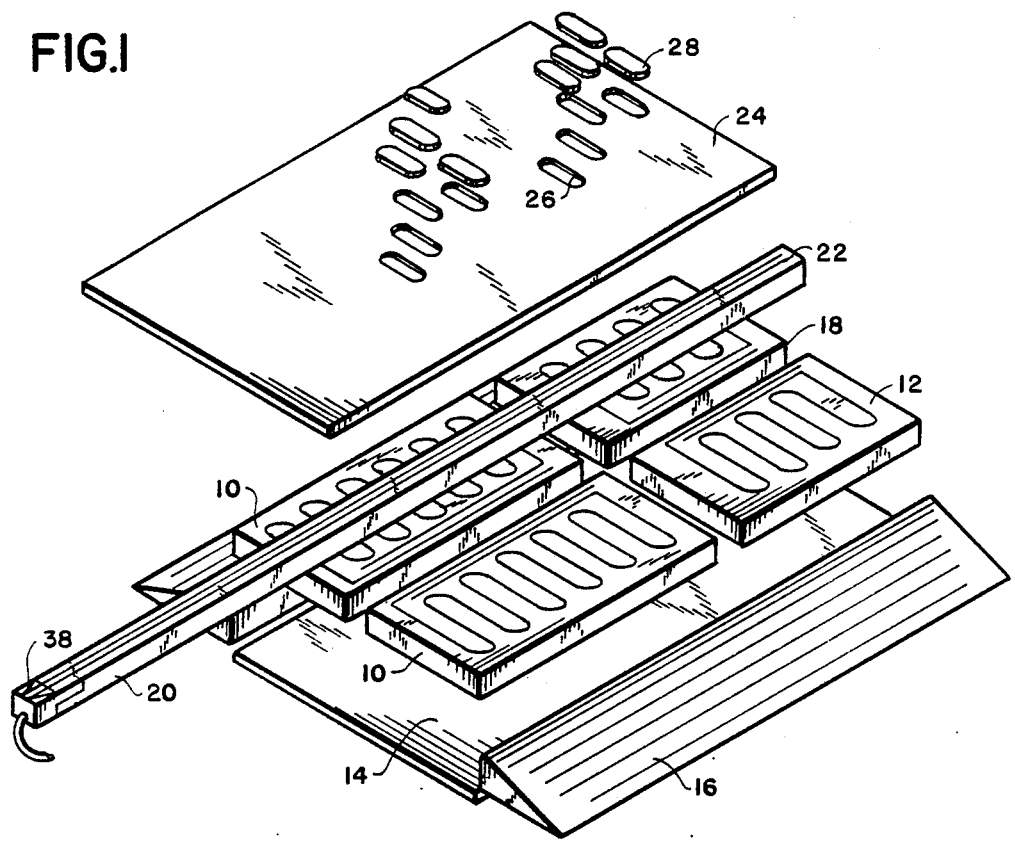
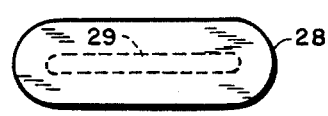
FIG.5
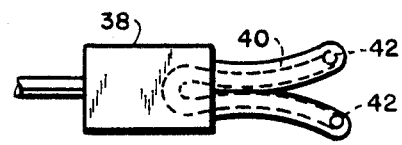
FIG.6
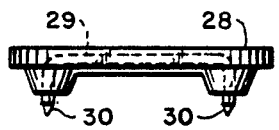
FIG.4
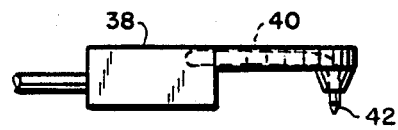
FIG.7

FIG.2
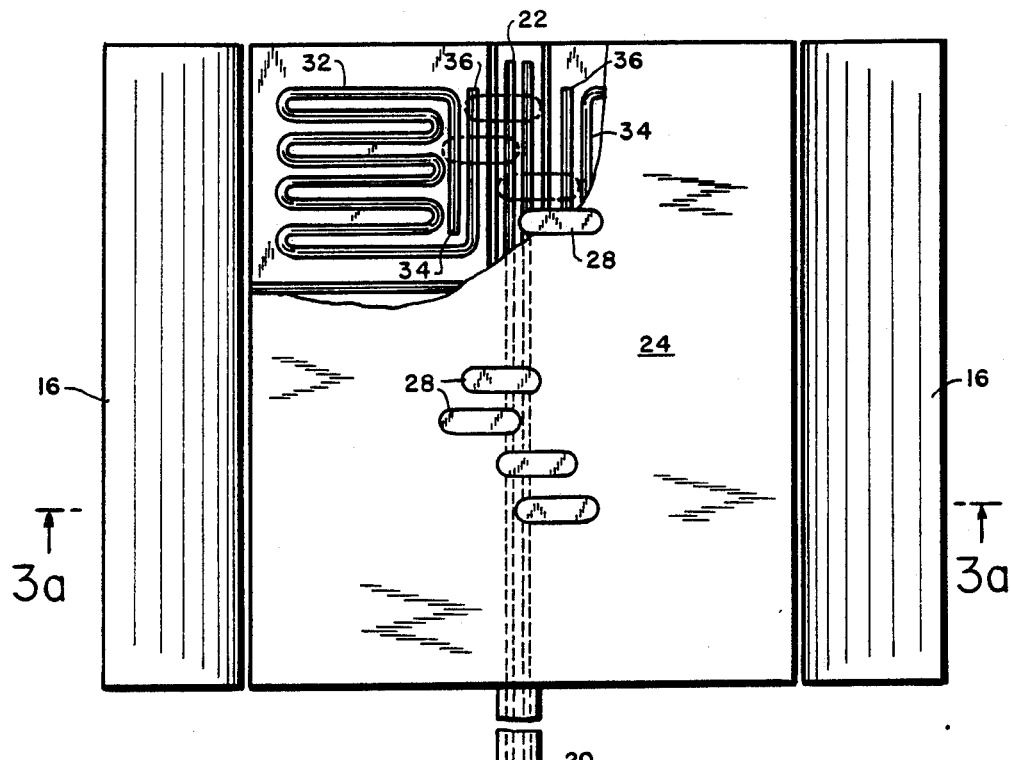
FIG.3
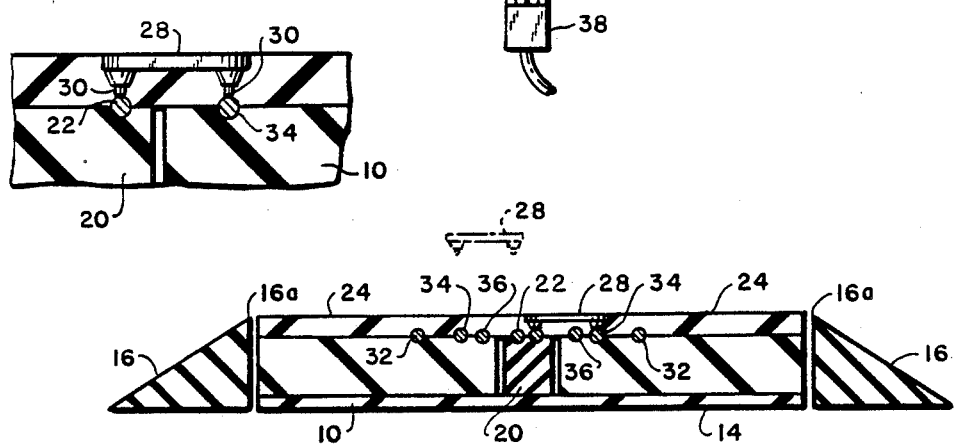
FIG.3a

UNI-DIRECTIONAL HEATING APPARATUS

This invention relates to an apparatus or system providing indirect heat from under floor or wall surfaces. More specifically, it is directed to a simplified and economical method of indirect radiant heat whereby the multidirectional heat characteristics are confined, so that heater elements project heat essentially in one direction.

BACKGROUND OF THE INVENTION

Direct heating devices are known however they have the drawback that many BTU'S of heat are wasted since the heat is projected in many directions, therefore a considerable amount of heat loss is the result, requiring further costly heating in order to heat a room or other enclosure to a comfortable temperature.

SUMMARY OF THE INVENTION

It is a principal feature of the present invention to provide a directional characteristic to indirect heating means so that the heat generated from the heating apparatus is substantially all directed into the room to be heated, and heat losses are held to a minimum.

It is the further feature of the present invention to provide a time conserving and a simplified installation method for the present heating apparatus.

Another object of the present invention is to provide a main body for the heating apparatus of silicone, teflon, or the like, which additionally works as a smoothener, and thereby substantially reduce the requirement of labor efforts for surface preparation.

A further object of the present invention is to incorporate a track system for the heating means where simple and water-tight connection by means of clamps are made so that an unlimited variety of room shapes and sizes can be provided for. Furthermore, a heat sensor is built into the heating system apparatus for connection to a thermostat or other type of regulating arrangement. It should also be noted that the present heating system can be used in wet conditions or environments, such as a bathroom, as well on dry surfaces. Further, the present heating apparatus can be combined with moisture/temperature sensors for automatic operation, such as snow removal.

It is an object of the present invention to incorporate the indirect heating system of the present invention under wood floors, carpet padding, outdoor driveways, sidewalks, and steps, etc. It can also be used for heating of a trailer, camper vehicle, or a boat.

BRIEF DESCRIPTIONS OF THE DRAWINGS

In order that the invention may be more clearly understood, it will now be disclosed in greater detail with reference to the accompanying drawing, where in:

FIG. 1 is an exploded perspective view of the Uni-Directional Heating Apparatus constructed in accordance with the teachings of my invention.

FIG. 2 is a top plan view of the Uni-Directional Heating Apparatus shown in FIG. 1 with part thereof broken away to reveal part of the interior construction thereof.

FIG. 3 is a fragmentary, enlarged cross-sectional view showing the removable electrical bridging connecting device connecting the conducting wires to the heating coil.

FIG. 3a is a cross-sectional view taken along the lines 3—3 of FIG. 2.

FIG. 4 is a side elevational view of showing one of the connecting elements.

FIG. 5 is a top plan view of a connecting element shown in FIG. 4.

FIG. 6 is an enlarged view of the terminal area of the electrical conducting wires of the heating apparatus.

FIG. 7 is a side elevational view of the elements shown in FIG. 6.

DESCRIPTION OF THE PREFERRED EMBODIMENT

As seen in FIGS. 1, 2, 3, and 3a an indirect radiant heating apparatus is shown which is both relatively flat and elongated so that it can be placed under wooden floors, carpet padding, between concrete and tiles in wet rooms such as bathrooms as well as under driveways, and sidewalks, as well as other applications. The carrier means 10 of the heating wires is fabricated from a highly insulating, flexible material such as teflon or silicone, hard foam or synthetic rubber, which is preferably molded in sheets and is provided with open channels for receiving heating wires 12. Carriers 10 which are a form of rectangular blocks rest on an insulating base 14. Located on either side of the base 14 are triangular-shaped ramps 16 which are designed to prevent tripping of persons walking over carpeting, and the like, with the indirect heating means underneath, as particularly seen in FIGS. 1–3a. Carriers 10 are shown mounted on the base 14 with a space 18 therebetween. In the space 18 is an elongated mounting bar having heating wires 22 embedded in the top thereof, as particularly seen in FIG. 3. Further, as seen in FIG. 3a, carriers 10 as well as the mounting bar 20 which are positioned on the base 14 are of a height which is just below the apices 16a of the ramp 16 forming a depression therebetween. Consequently, a poor insulating or heat transmitting cover plate 24 can be placed in the depression so that the cover plate is flush with the apices 16a of the ramps 16. The low insulating and radiating cover plate 24 is provided with a series of elongated openings 26 which precisely accommodate a plurity of waterproof, completely enclosed electrical connecting devices 28 which are shown in FIGS. 4 and 5 of the drawings. The connecting devices 28 are provided with spaced conductive connecting pins 30 which are interconnected by wires 29 to form an electrical bridge. Furthermore, each of the covers of the connectors 28 are fabricated of an insulating material.

As seen in FIG. 2, a sinuous heating coil 32 is shown provided with connectors 28 bridging and electrically connecting the legs 34 and 36 respectively of the coil. It should be evident that completing of the circuit is easily facilitated by merely snapping the removable connectors through the openings 26 and into contact with a heating wire 22 and the selected legs 34 and 36 of the heating coil 32.

Referring now to FIGS. 6 and 7, the terminal block 38 at an end of mounting bar 20 is shown having power cord connecting wires 4 and connecting pins 42 for engaging and connecting to conducting wires 22.

The use of silicone or teflon in the main body of heating device functions as a smoothener to compensate for unevenness and gaps in the floor surface. In addition, the use of a track arrangement makes for facile and water-tight connections by the clamping of the connector elements 28 and it should be evident that the present heating apparatus can be used for a variety of room shapes. The system can further accomodate a heat sensor (not shown) for connection to a regulator arrangement, such as a thermostat (not shown).

It should also be noted that the present apparatus is so constructed and arranged that the heat generated in the heating coils 32 is directed only toward the interior of the room because the other surrounding surfaces are highly insulated and thereby cause the heat of coils 32 to direct the heat manufactured therein into the atmosphere in the interior of the room, after penetrating through the low insulting cover plate 24.

While the present invention had been disclosed and described herein with reference to a certain embodiment, it is apparent that variations and modifications may be made which will fall within the true spirit and scope of the invention as defined in the following claims.

What is claimed is:

1. An uni-directional indirect heating apparatus comprising a base, at least a pair of carrier means mounted on said base having a space therebetween, said carrier means being constituted of a heat insulating material, an elongated mounting bar having an open top, said bar being positioned in said space between said carrier means and having conducting wires mounted in the open top thereof, a flat heating coil on the upper surface of said carrier means, at least one bridging electrical connecting device for electrically connecting said conducting wire to said heating coil, and a heat transmitting cover plate for said carrier means and said mounting bar wherein said heat generated by said heating coil is propelled substantially in one direction.

2. A heating apparatus as claimed in claim 1 wherein said carrier means is fabricated of flexible material.

3. A heating apparatus as claimed in claim 1 wherein electrical connecting devices have spaced contact pins which are connected by wire, and said connecting devices having an insulating cover.

4. A heating apparatus as claimed in claim 1 further comprising a triangular shaped ramp on opposite sides of said carrier means.

5. A heating apparatus as claimed in claim 1 wherein said heat transmitting cover is provided with openings that are substantially the same shape as said bridging electrical connecting devices.

6. An uni-directional indirect heating apparatus comprising a base, at least a pair of carrrier means mounted on said base having a space therebetween, said carrier means being constituted of a heat insulating material, an elongated mounting bar having an open top, said bar being positioned in said space between said carrier means and having electrical conducting wires mounted in the open top thereof, a flat heating coil on the upper surface of said carrier means, with said heat insulating material surrounding the bottom and sides of said heating coil at least one bridging electrical connecting device for electrically connecting said conducting wire to said heating coil, and a heat transmitting cover plate for said carrier means and said mounting bar wherein said heat generated by said heating coil is propelled in one direction.

* * * * *